United States Patent
Kaya et al.

(10) Patent No.: US 7,658,248 B2
(45) Date of Patent: Feb. 9, 2010

(54) HYBRID VEHICLE AND DRIVING RESISTANCE MEASUREMENT METHOD OF HYBRID VEHICLE

(75) Inventors: Yasuhiro Kaya, Toyota (JP); Junji Tokieda, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 433 days.

(21) Appl. No.: 11/628,238

(22) PCT Filed: Jun. 10, 2005

(86) PCT No.: PCT/JP2005/011177

§ 371 (c)(1),
(2), (4) Date: Dec. 1, 2006

(87) PCT Pub. No.: WO2006/003801

PCT Pub. Date: Jan. 12, 2006

(65) Prior Publication Data

US 2008/0029323 A1 Feb. 7, 2008

(30) Foreign Application Priority Data

Jul. 6, 2004 (JP) .............................. 2004-199229
Feb. 15, 2005 (JP) .............................. 2005-037536

(51) Int. Cl.
*B60W 10/00* (2006.01)

(52) U.S. Cl. ........................... 180/65.265; 180/65.21; 180/65.275; 180/65.28; 180/65.285; 180/65.29

(58) Field of Classification Search ................ 180/65.1, 180/65.2, 65.3, 65.4, 65.6, 65.7, 65.265, 180/65.275, 65.28, 65.29, 65.31; 903/902, 903/903, 904, 909, 910, 911, 915, 917, 918, 903/919, 924, 930, 940, 941, 942, 945

See application file for complete search history.

(56) References Cited

U.S. PATENT DOCUMENTS 5,801,497 A * 9/1998 Shamoto et al. ............. 318/139
6,161,640 A 12/2000 Yamaguchi

FOREIGN PATENT DOCUMENTS

EP 0 925 980 A2 6/1999

(Continued)

*Primary Examiner*—Lesley Morris
*Assistant Examiner*—Bryan A Evans
(74) *Attorney, Agent, or Firm*—Kenyon & Kenyon LLP

(57) ABSTRACT

In response to a coasting drive instruction for measurement of a driving resistance of a hybrid vehicle, the coasting control procedure of the invention prohibits a change of a gear position in a transmission and stops both an engine and a motor MG1. The coasting control procedure calculates a canceling torque, which cancels out a torque applied to a ring gear shaft or a drive shaft via a power distribution integration mechanism by generation of an inertia torque accompanied with a rotation speed change of the motor MG1. The calculated canceling torque is set to a torque command Tm2* of a motor MG2, and the motor MG2 is driven and controlled with the torque command Tm2*. This arrangement makes the ring gear shaft or the drive shaft completely free and enables accurate measurement of the driving resistance of the hybrid vehicle during such a coasting drive of the hybrid vehicle in a fully non-driving state.

21 Claims, 9 Drawing Sheets

FOREIGN PATENT DOCUMENTS

| | | |
|---|---|---|
| EP | 1 149 725 A2 | 10/2001 |
| EP | 1 255 175 A1 | 11/2002 |
| JP | 08-308021 | 11/1996 |
| JP | 10-295003 | 11/1998 |
| JP | 2000-087777 | 3/2000 |
| JP | 2000-148202 | 3/2000 |
| JP | 2000-148202 | 5/2000 |
| JP | 2003-104072 | 4/2003 |
| JP | 2004-156763 | 6/2004 |
| WO | WO 03/043846 A1 | 5/2003 |
| WO | WO 03043846 A1 * | 5/2003 |

* cited by examiner

# HYBRID VEHICLE AND DRIVING RESISTANCE MEASUREMENT METHOD OF HYBRID VEHICLE This is a 371 national phase application of PCT/JP2005/011177 filed 10 Jun. 2005, claiming priority to Japanese Patent Applications No. 2004-199229 filed 06 Jul. 2004, and No. 2005-037536 filed 15 Feb. 2005, the contents of which are incorporated herein by reference.

TECHNICAL FIELD

The present invention relates to a hybrid vehicle and driving resistance measurement method of hybrid vehicle.

BACKGROUND ART

One proposed hybrid vehicle has a driving system where a planetary gear unit functions to mutually connect a crankshaft of an engine, a drive shaft, a rotating shaft of a generator (see, for example, Japanese Patent Laid-Open Gazette No. 10-295003). In response to a demand for a non-driving state, a vehicle control device mounted on the hybrid vehicle regulates a rotation speed of the generator within an allowable rotation speed range, thus preventing the over speed of the generator.

DISCLOSURE OF THE INVENTION

The prior art hybrid vehicle may, however, fail to achieve a fully non-driving state in response to the demand for non-driving state. This leads to inaccurate measurement of a driving resistance of the hybrid vehicle. When the hybrid vehicle is controlled to have a non-driving state during its operation, the driving resistance gradually lowers the vehicle speed. The rotation speed of the generator changes with this variation in vehicle speed. An inertia torque is accordingly generated by the change of the rotation speed of the generator and is output to the drive shaft via the planetary gear unit. This prevents achievement of the fully non-driving state of the hybrid vehicle and results in inaccurate measurement of the driving resistance.

The hybrid vehicle of the invention and the corresponding driving resistance measurement method of the hybrid vehicle thus aim to ensure accurate measurement of the driving resistance.

At least part of the above and the other related objects is attained by a hybrid vehicle and driving resistance measurement method of hybrid vehicle of the invention having the configurations discussed below.

The present invention is directed to a hybrid vehicle, and the hybrid vehicle includes: an internal combustion engine; an electric power-mechanical power input output mechanism that is connected to an output shaft of the internal combustion engine and to a drive shaft linked with an axle of the hybrid vehicle and outputs at least part of output power of the internal combustion engine to the drive shaft through input and output of electric power and mechanical power; a motor that is capable of inputting and outputting power; a transmission unit that changes a gear ratio set for conversion of a power output from the motor to the drive shaft and a power input from the drive shaft to the motor; and a driving resistance measurement control module that controls the internal combustion engine, the electric power-mechanical power input output mechanism, the motor, and the transmission unit, in response to a predetermined operation, to set the hybrid vehicle in a driving resistance measurement mode for measurement of a driving resistance of the hybrid vehicle.

The internal combustion engine, the electric power-mechanical power input output mechanism, the motor, and the transmission unit are controlled in response to the predetermined operation, to set the hybrid vehicle in the driving resistance measurement mode for measurement of the driving resistance of the hybrid vehicle. This arrangement ensures accurate measurement of the driving resistance of the hybrid vehicle.

In the hybrid vehicle of the invention, the driving resistance measurement control module may control the internal combustion engine, the electric power-mechanical power input output mechanism, the motor, and the transmission unit to prohibit application of a driving force to the drive shaft via the electric power-mechanical power input output mechanism and the transmission unit. This arrangement effectively prohibits application of the driving force to the drive shaft via the electric power-mechanical power input output mechanism and the transmission unit, thus ensuring accurate measurement of the driving resistance of the hybrid vehicle. In this case, the driving resistance measurement control module may control the internal combustion engine, the electric power-mechanical power input output mechanism, the motor, and the transmission unit to give zero total of a power output to the drive shaft via the electric power-mechanical power input output mechanism and a power output to the drive shaft via the transmission unit.

In one preferable embodiment of the hybrid vehicle of the invention that is controlled to give the zero total of powers output to the drive shaft via the electric power-mechanical power input output mechanism and via the transmission unit, the electric power-mechanical power input output mechanism includes: a three shaft-type power input output module that is linked to three shafts, the output shaft of the internal combustion engine, the drive shaft, and a rotating shaft, and automatically determines power input from and output to a residual one shaft based on powers input from and output to any two shafts among the three shafts; and a generator that inputs and outputs power from and to the rotating shaft, and the driving resistance measurement control module may control the internal combustion engine to be driven at a preset rotation speed, control the generator to prohibit any power input and output, control the transmission unit to prohibit a change of the gear ratio, and control the motor to cause a power output to the drive shaft via the three shaft-type power input output module with a variation in rotation speed of the generator to be cancelled out by the power output to the drive shaft via the transmission unit. The hybrid vehicle of this embodiment enables the power output from the motor to the drive shaft via the transmission unit to cancel out the power output to the drive shaft via the three shaft-type power input output module with a variation in rotation speed of the generator. The hybrid vehicle accordingly falls in a fully non-driving state. The transmission unit is controlled to prohibit a change of the gear ratio. This arrangement effectively prevents an inertia torque from being generated by an abrupt change of the rotation speed of the motor with a change of the gear ratio and being applied to the drive shaft via the transmission unit, thus ensuring accurate measurement of the driving resistance. In one preferable embodiment of the hybrid vehicle of the invention, the transmission unit may be a step transmission having multiple different speeds, and the driving resistance measurement control module may control the transmission unit to fix the speed to a high speed position. Also, the driving resistance measurement control module may control the internal combustion engine to have a stop at a rotation speed of 0.

In another preferable embodiment of the hybrid vehicle of the invention that is controlled to give the zero total of powers output to the drive shaft via the electric power-mechanical power input output mechanism and via the transmission unit, the electric power-mechanical power input output mechanism includes: a three shaft-type power input output module that is linked to three shafts, the output shaft of the internal combustion engine, the drive shaft, and a rotating shaft, and automatically determines power input from and output to a residual one shaft based on powers input from and output to any two shafts among the three shafts; and a generator that inputs and outputs power from and to the rotating shaft. The transmission unit may connect and disconnect the motor with and from the drive shaft, and the driving resistance measurement control module may control the generator to prohibit any power input and output, control the internal combustion engine to drive the generator at a preset rotation speed, control the transmission unit to disconnect the motor from the drive shaft, and control the motor to prohibit any power input and output. The hybrid vehicle of this embodiment makes the power applied to the drive shaft via the three shaft-type input output module equal to zero, while making the power applied to the drive shaft via the transmission unit equal to zero. There is accordingly zero total of the power applied to the drive shaft via the three shaft-type power input output module and the power applied to the drive shaft via the transmission unit. This arrangement causes the hybrid vehicle to fall in a fully non-driving state and thus ensures accurate measurement of the driving resistance. In this case, the driving resistance measurement control module may control the internal combustion engine to stop the generator at a rotation speed of 0. The hybrid vehicle further includes: a drive shaft rotation speed measurement unit that measures a rotation speed of the drive shaft, and the driving resistance measurement control module may compute a target rotation speed of the output shaft of the internal combustion engine to rotate the rotating shaft at the preset rotation speed, based on the rotation speed of the drive shaft measured by the drive shaft rotation speed measurement unit and a rotation relation of the three shafts in the three shaft-type power input output module, and control the internal combustion engine to be driven at the computed target rotation speed. This arrangement adequately controls the motor to rotate at the preset rotation speed. The hybrid vehicle further includes: a rotor rotation speed measurement unit that measures a rotation speed of a rotor in the motor, and the driving resistance measurement control module may calculate a rotation speed of the drive shaft from the rotation speed of the rotor in the motor measured by the rotor rotation speed measurement unit and the gear ratio set in the transmission unit, compute a target rotation speed of the output shaft of the internal combustion engine to rotate the rotating shaft at the preset rotation speed, based on the calculated rotation speed of the drive shaft and a rotation relation of the three shafts in the three shaft-type power input output module, and control the internal combustion engine to be driven at the computed target rotation speed. This arrangement adequately controls the motor to rotate at the preset rotation speed.

Moreover, in another preferable embodiment of the hybrid vehicle of the invention that is controlled to give the zero total of powers output to the drive shaft via the electric power-mechanical power input output mechanism and via the transmission unit, the electric power-mechanical power input output mechanism includes: a three shaft-type power input output module that is linked to three shafts, the output shaft of the internal combustion engine, the drive shaft, and a rotating shaft, and automatically determines power input from and output to a residual one shaft based on powers input from and output to any two shafts among the three shafts; and a generator that inputs and outputs power from and to the rotating shaft, and the driving resistance measurement control module may control the generator to prohibit any power input and output, control the internal combustion engine to drive the generator at a preset rotation speed, control the transmission unit to prohibit a change of the gear ratio, and control the motor to prohibit any power input and output. The hybrid vehicle of this embodiment makes the power applied to the drive shaft equal to zero. There is accordingly zero total of the power applied to the drive shaft via the three shaft-type power input output module and the power applied to the drive shaft via the transmission unit. This arrangement causes the hybrid vehicle to fall in a fully non-driving state and thus ensures accurate measurement of the driving resistance. In this case, the driving resistance measurement control module may control the internal combustion engine to stop the generator at a rotation speed of 0. The hybrid vehicle further includes: a drive shaft rotation speed measurement unit that measures a rotation speed of the drive shaft, and the driving resistance measurement control module may compute a target rotation speed of the output shaft of the internal combustion engine to rotate the rotating shaft at the preset rotation speed, based on the rotation speed of the drive shaft measured by the drive shaft rotation speed measurement unit and a rotation relation of the three shafts in the three shaft-type power input output module, and control the internal combustion engine to be driven at the computed target rotation speed. This arrangement adequately controls the motor to rotate at the preset rotation speed. The hybrid vehicle further includes: a rotor rotation speed measurement unit that measures a rotation speed of a rotor in the motor, and the driving resistance measurement control module may calculate a rotation speed of the drive shaft from the rotation speed of the rotor in the motor measured by the rotor rotation speed measurement unit and the gear ratio set in the transmission unit, compute a target rotation speed of the output shaft of the internal combustion engine to rotate the rotating shaft at the preset rotation speed, based on the calculated rotation speed of the drive shaft and a rotation relation of the three shafts in the three shaft-type power input output module, and control the internal combustion engine to be driven at the computed target rotation speed. This arrangement adequately controls the motor to rotate at the preset rotation speed.

The present invention is also directed to a driving resistance measurement method of measuring a driving resistance of a hybrid vehicle, and the hybrid vehicle includes: an internal combustion engine; an electric power-mechanical power input output mechanism that is connected to an output shaft of the internal combustion engine and to a drive shaft linked with an axle of the hybrid vehicle and outputs at least part of output power of the internal combustion engine to the drive shaft through input and output of electric power and mechanical power; a motor that is capable of inputting and outputting power; and a transmission unit that changes a gear ratio set for conversion of a power output from the motor to the drive shaft and a power input from the drive shaft to the motor, and the driving resistance measurement method of the hybrid vehicle measures the driving resistance of the hybrid vehicle, while controlling the internal combustion engine, the electric power-mechanical power input output mechanism, the motor, and the transmission unit to prohibit application of a driving force to the drive shaft via the electric power-mechanical power input output mechanism and the transmission unit.

The driving resistance measurement method of the hybrid vehicle of the invention controls the internal combustion engine, the electric power-mechanical power input output mechanism, the motor, and the transmission unit to prohibit application of a driving force to the drive shaft linked to the axle of the hybrid vehicle via the electric power-mechanical power input output mechanism and the transmission unit. This arrangement ensures accurate measurement of the driving resistance of the hybrid vehicle.

The driving resistance measurement method of the hybrid vehicle of the invention may measure the driving resistance of the hybrid vehicle, while controlling the internal combustion engine, the electric power-mechanical power input output mechanism, the motor, and the transmission unit to give zero total of a power output to the drive shaft via the electric power-mechanical power input output mechanism and a power output to the drive shaft via the transmission unit.

In one preferable embodiment of the driving resistance measurement method of the hybrid vehicle of the invention that is controlled to give the zero total of powers output to the drive shaft via the electric power-mechanical power input output mechanism and via the transmission unit, the electric power-mechanical power input output mechanism includes: a three shaft-type power input output module that is linked to three shafts, the output shaft of the internal combustion engine, the drive shaft, and a rotating shaft, and automatically determines power input from and output to a residual one shaft based on powers input from and output to any two shafts among the three shafts; and a generator that inputs and outputs power from and to the rotating shaft, and the driving resistance measurement method measures the driving resistance of the hybrid vehicle, while controlling the internal combustion engine to be driven at a preset rotation speed, controlling the generator to prohibit any power input and output, controlling the transmission unit to prohibit a change of the gear ratio, and controlling the motor to cause a power output to the drive shaft via the three shaft-type power input output module with a variation in rotation speed of the generator to be cancelled out by the power output to the drive shaft via the transmission unit. The driving resistance measurement method of the hybrid vehicle of this embodiment enables the power output from the motor to the drive shaft via the transmission unit to cancel out the power output to the drive shaft via the three shaft-type power input output module with a variation in rotation speed of the generator. The driving resistance measurement method accordingly falls in a fully non-driving state. The transmission unit is controlled to prohibit a change of the gear ratio. This arrangement effectively prevents an inertia torque from being generated by an abrupt change of the rotation speed of the motor with a change of the gear ratio and being applied to the drive shaft via the transmission unit, thus ensuring accurate measurement of the driving resistance.

In another preferable embodiment of the driving resistance measurement method of the hybrid vehicle of the invention that is controlled to give the zero total of powers output to the drive shaft via the electric power-mechanical power input output mechanism and via the transmission unit, the electric power-mechanical power input output mechanism includes: a three shaft-type power input output module that is linked to three shafts, the output shaft of the internal combustion engine, the drive shaft, and a rotating shaft, and automatically determines power input from and output to a residual one shaft based on powers input from and output to any two shafts among the three shafts; and a generator that inputs and outputs power from and to the rotating shaft, and the transmission unit may connect and disconnect the motor with and from the drive shaft, and the driving resistance measurement method may measure the driving resistance of the hybrid vehicle, while controlling the generator to prohibit any power input and output, controlling the internal combustion engine to drive the generator at a preset rotation speed, controlling the transmission unit to disconnect the motor from the drive shaft, and controlling the motor to prohibit any power input and output. The driving resistance measurement method of the hybrid vehicle of this embodiment makes the power applied to the drive shaft via the three shaft-type input output module equal to zero, while making the power applied to the drive shaft via the transmission unit equal to zero. There is accordingly zero total of the power applied to the drive shaft via the three shaft-type power input output module and the power applied to the drive shaft via the transmission unit. This arrangement causes the hybrid vehicle to fall in a fully non-driving state and thus ensures accurate measurement of the driving resistance. In this case, the driving resistance measurement method may either directly or indirectly measure a rotation speed of the drive shaft, and the driving resistance measurement method also measures the driving resistance of the hybrid vehicle, while computing a target rotation speed of the output shaft of the internal combustion engine to rotate the rotating shaft at the preset rotation speed, based on the measured rotation speed of the drive shaft and a rotation relation of the three shafts in the three shaft-type power input output module, and controlling the internal combustion engine to be driven at the computed target rotation speed. This arrangement adequately controls the motor to rotate at the preset rotation speed.

Moreover, in another preferable embodiment of the driving resistance measurement method of the hybrid vehicle of the invention that is controlled to give the zero total of powers output to the drive shaft via the electric power-mechanical power input output mechanism and via the transmission unit, the electric power-mechanical power input output mechanism includes: a three shaft-type power input output module that is linked to three shafts, the output shaft of the internal combustion engine, the drive shaft, and a rotating shaft, and automatically determines power input from and output to a residual one shaft based on powers input from and output to any two shafts among the three shafts; and a generator that inputs and outputs power from and to the rotating shaft, and the driving resistance measurement method measures the driving resistance of the hybrid vehicle, while controlling the generator to prohibit any power input and output, controlling the internal combustion engine to drive the generator at a preset rotation speed, controlling the transmission unit to prohibit a change of the gear ratio, and controlling the motor to prohibit any power input and output. The driving resistance measurement method of the hybrid vehicle of this embodiment makes the power applied to the drive shaft via the three shaft-type input output module equal to zero, while making the power applied to the drive shaft via the transmission unit equal to zero. There is accordingly zero total of the power applied to the drive shaft via the three shaft-type power input output module and the power applied to the drive shaft via the transmission unit. This arrangement causes the hybrid vehicle to fall in a fully non-driving state and thus ensures accurate measurement of the driving resistance. In this case, the driving resistance measurement method may either directly or indirectly measure a rotation speed of the drive shaft, and the driving resistance measurement method also measures the driving resistance of the hybrid vehicle, while computing a target rotation speed of the output shaft of the internal combustion engine to rotate the rotating shaft at the preset rotation speed, based on the measured rotation speed of the drive shaft and a rotation relation of the three shafts in the three shaft-type power input output module, and controlling the internal combustion engine to be driven at the computed target rotation speed. This arrangement adequately controls the motor to rotate at the preset rotation speed.

BEST MODES FOR CARRYING OUT THE INVENTION

Figure 1:
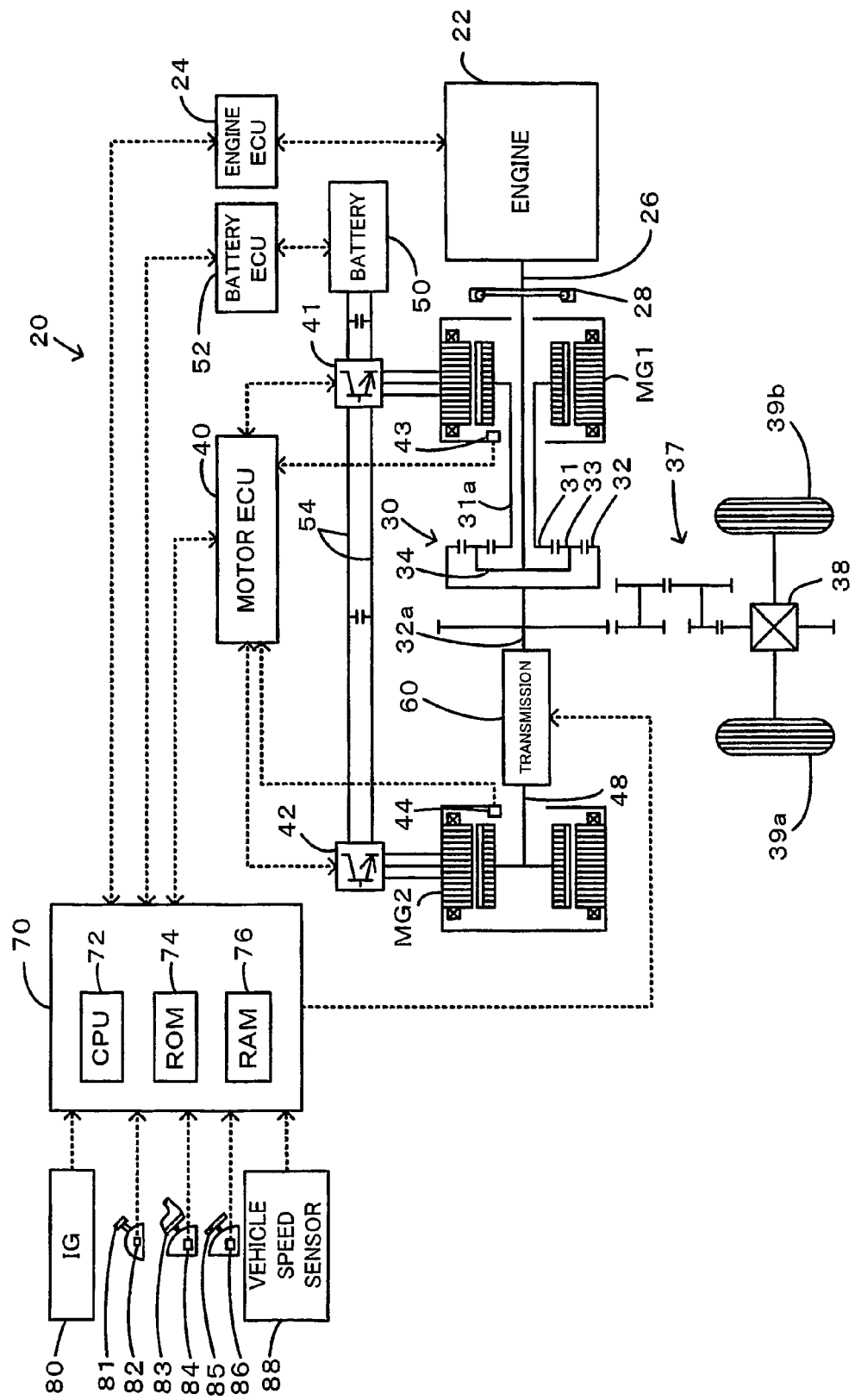
FIG. 1 schematically illustrates the configuration of a hybrid vehicle in one embodiment of the invention.

Some modes of carrying out the invention are described below as preferred embodiments. FIG. 1 schematically illustrates the configuration of a hybrid vehicle 20 in one embodiment of the invention. As illustrated, the hybrid vehicle 20 of the embodiment includes an engine 22, a three shaft-type power distribution integration mechanism 30 that is linked to a crankshaft 26 or an output shaft of the engine 22 via a damper 28, a motor MG1 that is linked to the power distribution integration mechanism 30 and is capable of generating electric power, a motor MG2 that is linked to the power distribution integration mechanism 30 via a transmission 60, and a hybrid electronic control unit 70 that controls the whole driving system of the hybrid vehicle 20.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the motor MG2 via the transmission 60. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The ring gear 32 is mechanically connected to front drive wheels 39a and 39b of the hybrid vehicle 20 via a ring gear shaft 32a, a gear mechanism 37 and a differential gear 38. The power output to the ring gear 32 is thus transmitted to the drive wheels 39a and 39b via the ring gear shaft 32a, the gear mechanism 37, and the differential gear 38. In the driving system of the hybrid vehicle 20, the power distribution integration mechanism 30 is linked to three shafts, the crankshaft 26 or the output shaft of the engine 22 connected with the carrier 34, a sun gear shaft 31a or a rotating shaft of the motor MG1 connected with the sun gear 31, and the ring gear shaft 32a or a drive shaft connected with the ring gear 32 and mechanically linked to the drive wheels 39a and 39b.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 executes a rotation speed computation routine (not shown) to calculate rotation speeds Nm1 and Nm2 of the respective rotors in the motors MG1 and MG2 from the input signals of the rotational position detection sensors 43 and 44. The motor ECU 40 establishes communication with the hybrid electronic control unit 70 and receives control signals from the hybrid electronic control unit 70 to drive and control the motors MG1 and MG2, while outputting data regarding the driving conditions of the motors MG1 and MG2 to the hybrid electronic control unit 70 according to the requirements.

Figure 2:
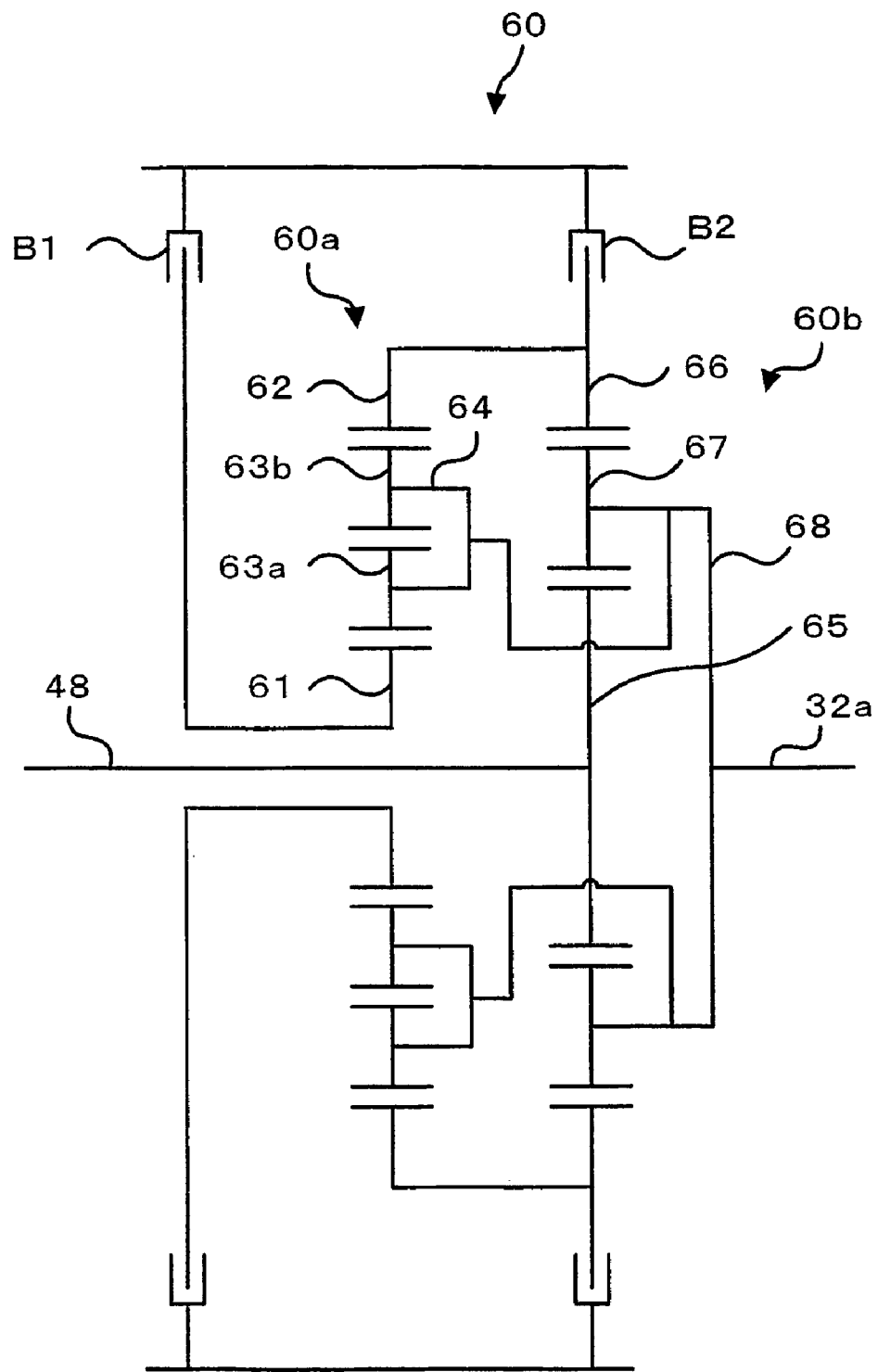
FIG. 2 shows one typical structure of a transmission included in the hybrid vehicle of the embodiment.

The transmission 60 functions to connect and disconnect a rotating shaft 48 of the motor MG2 with and from the ring gear shaft 32a. In the connection state, the transmission 60 reduces the rotation speed of the rotating shaft 48 of the motor MG2 at two different reduction gear ratios and transmits the reduced rotation speed to the ring gear shaft 32a. One typical structure of the transmission 60 is shown in FIG. 2. The transmission 60 shown in FIG. 2 has a double-pinion planetary gear mechanism 60a, a single-pinion planetary gear mechanism 60b, and two brakes B1 and B2. The double-pinion planetary gear mechanism 60a includes a sun gear 61 as an external gear, a ring gear 62 as an internal gear arranged concentrically with the sun gear 61, multiple first pinion gear 63a engaging with the sun gear 61, multiple second pinion gears 63b engaging with the multiple first pinion gears 63a and with the ring gear 62, and a carrier 64 coupling the multiple first pinion gears 63a with the multiple second pinion gears 63b to allow both their revolutions and their rotations on their axes. The engagement and the release of the brake B1 stop and allow the rotation of the sun gear 61. The single-pinion planetary gear mechanism 60b includes a sun gear 65 as an external gear, a ring gear 66 as an internal gear arranged concentrically with the sun gear 65, multiple pinion gears 67 engaging with the sun gear 65 and with the ring gear 66, and a carrier 68 holding the multiple pinion gears 67 to allow both their revolutions and their rotations on their axes.

The sun gear 65 and the carrier 68 are respectively connected to the rotating shaft 48 of the motor MG2 and to the ring gear shaft 32a. The engagement and the release of the brake B2 stop and allow the rotation of the ring gear 66. The double-pinion planetary gear mechanism 60a and the single-pinion planetary gear mechanism 60b are coupled with each other via linkage of the respective ring gears 62 and 66 and linkage of the respective carriers 64 and 68. In the transmission 60, the combination of the released brakes B1 and B2 disconnects the rotating shaft 48 of the motor MG2 from the ring gear shaft 32a. The combination of the released brake B1 and the engaged brake B2 reduces the rotation of the rotating shaft 48 of the motor MG2 at a relatively high reduction gear ratio and transmits the reduced rotation to the ring gear shaft 32a. This state is expressed as Lo gear position. The combination of the engaged brake B1 and the released brake B2 reduces the rotation of the rotating shaft 48 of the motor MG2 at a relatively low reduction gear ratio and transmits the reduced rotation to the ring gear shaft 32a. This state is expressed as Hi gear position. The combination of the engaged brakes B1 and B2 prohibits the rotations of the rotating shaft 48 and the ring gear shaft 32a.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature measured by a temperature sensor (not shown) attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives, via its input port, an ignition signal from an ignition switch 80, a gearshift position SP or a current setting position of a gearshift lever 81 from a gearshift position sensor 82, an accelerator opening Adrv or the driver's depression amount of an accelerator pedal 83 from an accelerator pedal position sensor 84, a brake pedal position BP or the driver's depression amount of a brake pedal 85 from a brake pedal position sensor 86, a vehicle speed V from a vehicle speed sensor 88, and wheel speeds Vwa and Vwb from wheel speed sensors 89a and 89b attached to the drive wheels 39a and 39b. The hybrid electronic control unit 70 outputs drive signals to actuators (not shown) to regulate engagement and release of the brakes B1 and B2 in the transmission 60. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Adrv, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 3:
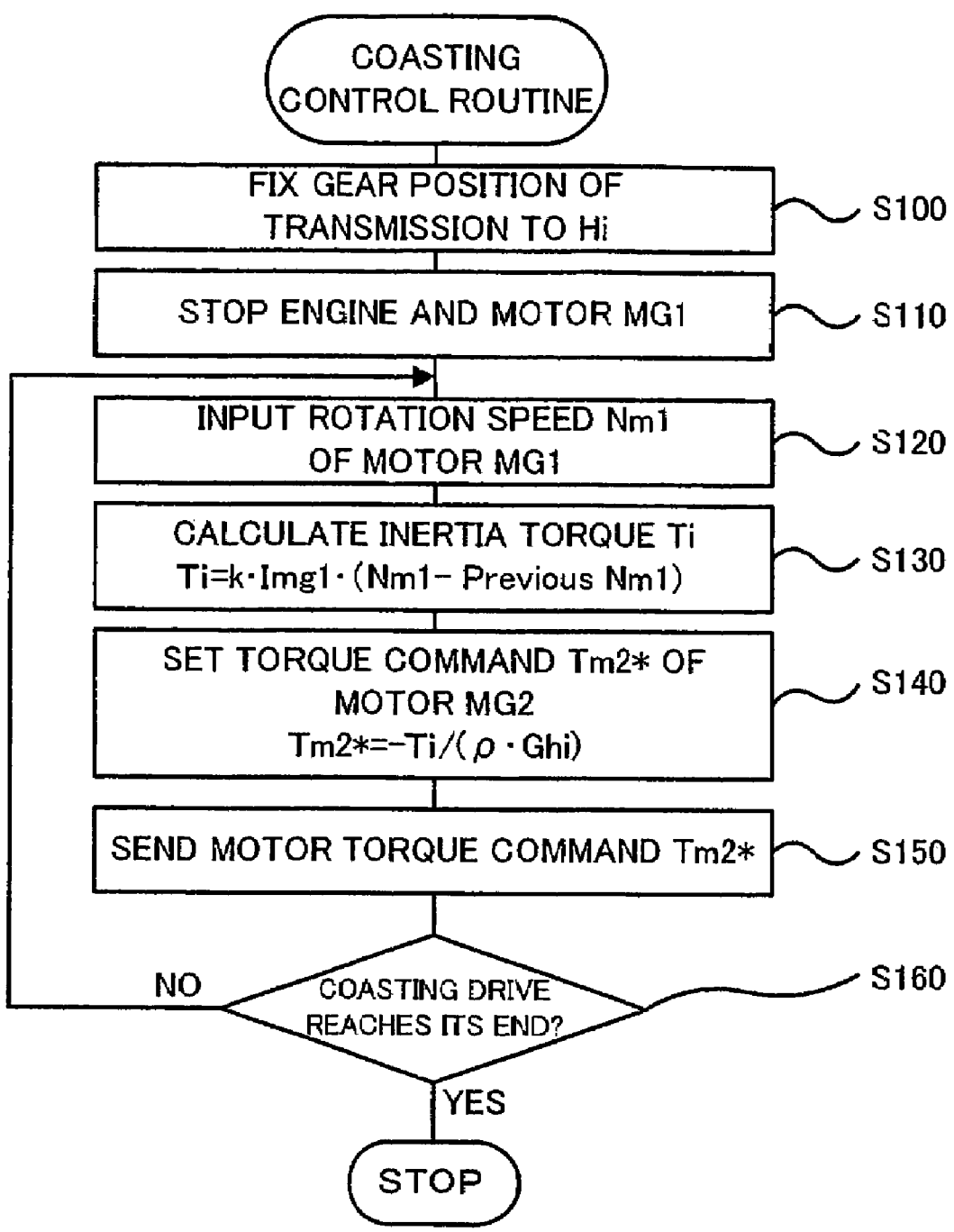
FIG. 3 is a flowchart showing a coasting control routine executed by a hybrid electronic control unit in the hybrid vehicle of the embodiment.

The following description regards the operations of the hybrid vehicle 20 of the embodiment having the configuration discussed above, especially a series of operations in a coasting drive for measurement of the driving resistance of the hybrid vehicle 20. FIG. 3 is a coasting control routine executed by the hybrid electronic control unit 70 of the embodiment in response to a coasting drive instruction for measurement of the driving resistance of the hybrid vehicle 20.

Figure 4:
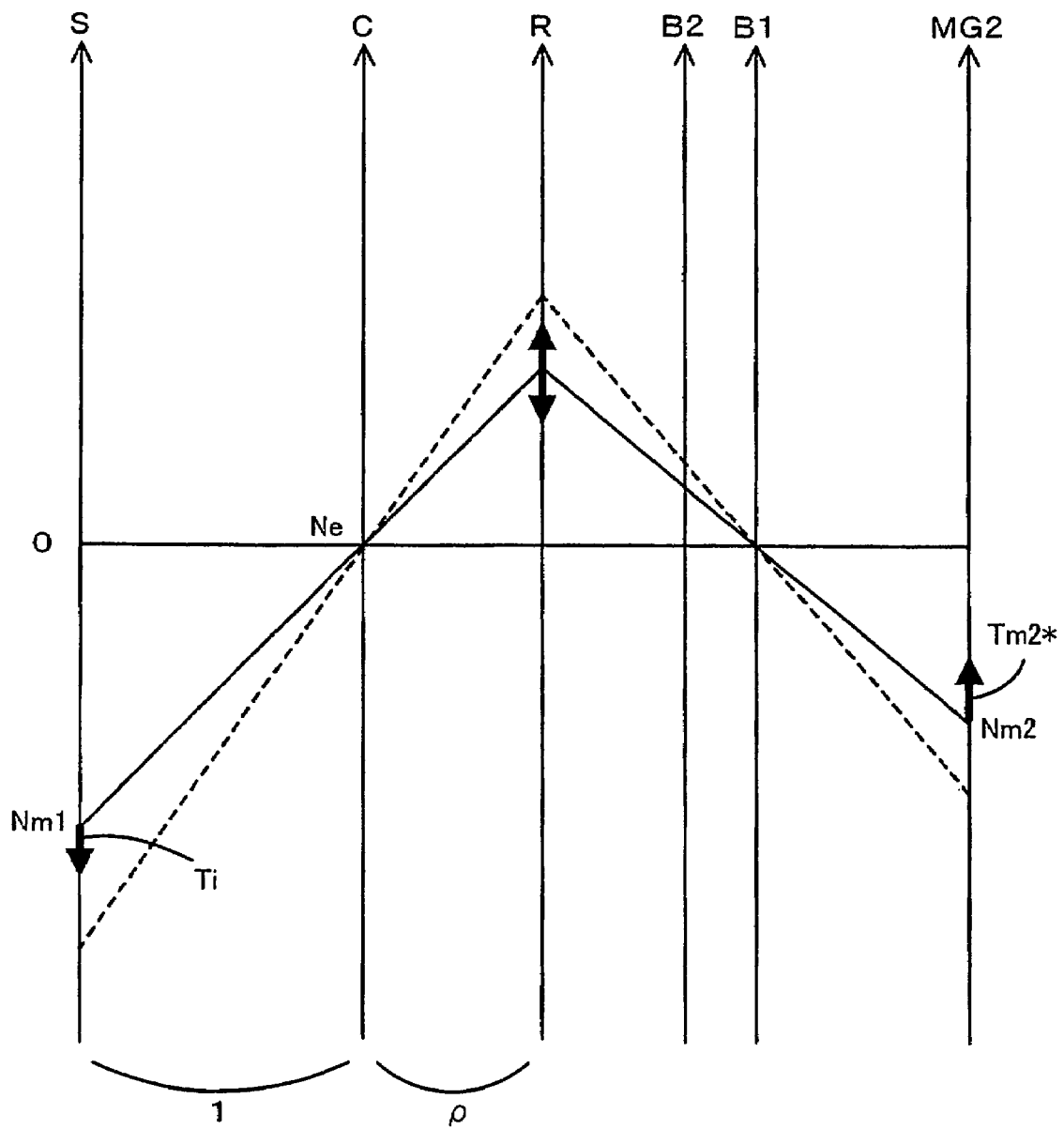
FIG. 4 is an alignment chart showing torque-rotation speed dynamics of respective rotation elements included in a power distribution integration mechanism when both an engine and a motor MG2 are at a stop and gear position of the transmission is fixed to a Hi gear position.

In the coasting control routine, the CPU 72 of the hybrid electronic control unit 70 first fixes the gear position of the transmission 60 to the Hi gear position (step S100) and stops the engine 22 and the motor MG1 (step S110). A coasting drive instruction for measurement of the driving resistance is generally given during a relatively high-speed drive of the vehicle. The transmission 60 is set to the Hi gear position in the conditions of the relatively high speed drive. Fixation of the gear position of the transmission 60 to the Hi gear position prohibits a gear change to the Lo gear position even when the vehicle speed V decreases to a level that generally requires a gear change to the Lo gear position. The CPU 72 outputs operation stop instructions of the engine 22 and of the motor MG1 respectively to the engine ECU 24 and the motor ECU 40. The engine ECU 24 and the motor ECU 40 then respectively stop the engine 22 and the motor MG1 in response to the received operation stop instructions. The engine 22 accordingly stops its rotation through the compression work and the friction, while the motor MG1 rotates at a gear ratio of the power distribution integration mechanism 30. FIG. 4 is an alignment chart showing torque-rotation speed dynamics of the respective rotation elements included in the power distribution integration mechanism 30 when both the engine 22 and the motor MG1 are at a stop and the gear position of the transmission 60 is fixed to the Hi gear position. The axis 'S' represents the rotation speed of the sun gear 31 that is equivalent to the rotation speed Nm1 of the motor MG1. The axis 'C' represents the rotation speed of the carrier 34 that is equivalent to the rotation speed Ne of the engine 22. The axis 'R' represents the rotation speed of the ring gear 32. The axis 'B2' represents the rotation speed of the ring gear 66 of the single-pinion planetary gear mechanism 60b in the transmission 60, which is engaged and disengaged by the brake B2. The axis 'B1' represents the rotation speed of the sun gear 61 of the double-pinion planetary gear mechanism 60a in the transmission 60, which is engaged and disengaged by the brake B1.

The axis 'MG2' represents the rotation speed of the rotating shaft 48 that is equivalent to the rotation speed Nm2 of the motor MG2. The solid line plot shows a rotation speed relation at a certain time point, and the broken line plot shows a rotation speed relation at a previous time point before the certain time point of the solid line plot. The meanings of the respective arrows are given below.

The coasting control routine then inputs the current rotation speed Nm1 of the motor MG1 (step S120) and calculates an inertia torque Ti, which is caused by a rotation speed change of the motor MG1, according to Equation (1) given below (step S130). The inertia torque Ti is given as the product of a moment of inertia Img1 in the rotation system including the rotor of the motor MG1, a rotation speed change of the motor MG1 (=current rotation speed Nm1−previous rotation speed Previous Nm1), and a predetermined coefficient k:

$$Ti = k \cdot Img1 \cdot (Nm1 - \text{Previous } Nm1) \quad (1)$$

The current rotation speed Nm1 of the motor MG1 is computed from the rotational position of the rotor of the motor MG1 detected by the rotational position detection sensor 43 and is received from the motor ECU 40 by communication. The calculated inertia torque Ti is shown by a downward arrow on the axis 'S' in FIG. 4. A torque applied to the ring gear shaft 32a via the power distribution integration mechanism 30 by generation of the inertia torque Ti is shown by an upward arrow on the axis 'R' in FIG. 4.

The coasting control routine subsequently calculates a canceling torque, which cancels out the torque applied to the ring gear shaft 32a or the drive shaft via the power distribution integration mechanism 30 by generation of the inertia torque Ti, according to Equation (2) given below, and sets the calculated canceling torque to a torque command Tm2* of the motor MG2 (step S140):

$$Tm2^* = -Ti/(\rho \cdot Ghi) \quad (2)$$

The torque command Tm2* of the motor MG2 is sent to the motor ECU 40 (step S150). In Equation (2), ρ denotes a gear ratio of the power distribution integration mechanism 30 (=the number of teeth of the sun gear 31 to the number of teeth of the ring gear 32), and Ghi denotes a reduction gear ratio at the Hi gear position of the transmission 60. The motor ECU 40 receives the torque command Tm2* and executes switching control of the switching elements included in the inverter 42 to ensure output of a torque corresponding to the torque command Tm2* from the motor MG2. The calculated torque command Tm2* of the motor MG2 is shown by an upward arrow on the axis 'MG2' in FIG. 4. A torque applied to the ring gear shaft 32a via the transmission 60 by the setting of the torque command Tm2* is shown by a downward arrow on the axis 'R'. On the axis 'R', the torque applied via the power distribution integration mechanism 30 by generation of the inertia torque Ti is cancelled out by the torque applied via the transmission 60 by the setting of the torque command Tm2* of the motor MG2. Practically no torque thus acts on the axis 'R'. The hybrid vehicle 20 is accordingly coasted in a fully non-driving state. This control enables accurate measurement of the driving resistance during such a coasting drive in the non-driving state.

The coasting control routine then determines whether the coasting drive reaches its end (step S160). In the condition of the continuous coasting drive, the coasting control routine repeats the processing of and after step S120. The routine thus repeatedly receives the current rotation speed Nm1 of the motor MG1, calculates the inertia torque Ti caused by a rotation speed change of the motor MG1, and controls the motor MG2 to cancel out the torque applied to the ring gear shaft 32a via the power distribution integration mechanism 30 by generation of the inertia torque Ti. The hybrid vehicle 20 of the first embodiment can thus continue the coasting drive in the fully non-driving state to its end. The coasting control routine is terminated, when it is determined at step S160 that the coasting drive reaches its end.

As described above, the hybrid vehicle 20 of the first embodiment controls the motor MG2 to cancel out the torque applied to the ring gear shaft 32a or the drive shaft via the power distribution integration mechanism 30 by generation of the inertia torque Ti due to a rotation speed change of the motor MG1. This control enables the hybrid vehicle 20 to be coasted in the fully non-driving state and thus ensures accurate measurement of the driving resistance of the hybrid vehicle 20. The gear change of the transmission 60 is prohibited during the coasting drive. This effectively prevents the occurrence of a potential torque shock caused by the gear change of the transmission 60.

The hybrid vehicle 20 of the embodiment fixes the gear position of the transmission 60 to the Hi gear position during the coasting drive. The requirement is to prohibit a gear change of the transmission 60. One possible modification may thus fix the gear position of the transmission 60 to the Lo gear position.

The hybrid vehicle 20 of the embodiment stops the operation of the engine 22 at the rotation speed of 0. One possible modification may not completely stop the operation of the engine 22 but may idle the engine 22 at a preset rotation speed (for example, 1000 rpm).

A hybrid vehicle 20B of a second embodiment is described below as another mode of carrying out the invention. The hybrid vehicle 20B of the second embodiment has the identical hardware configuration with that of the hybrid vehicle 20 of the first embodiment shown in FIGS. 1 and 2. The respective constituents of the hybrid vehicle 20B of the second embodiment are expressed by the same numerals and symbols as those of the hybrid vehicle 20 of the first embodiment and are not specifically described here.

Figure 5:
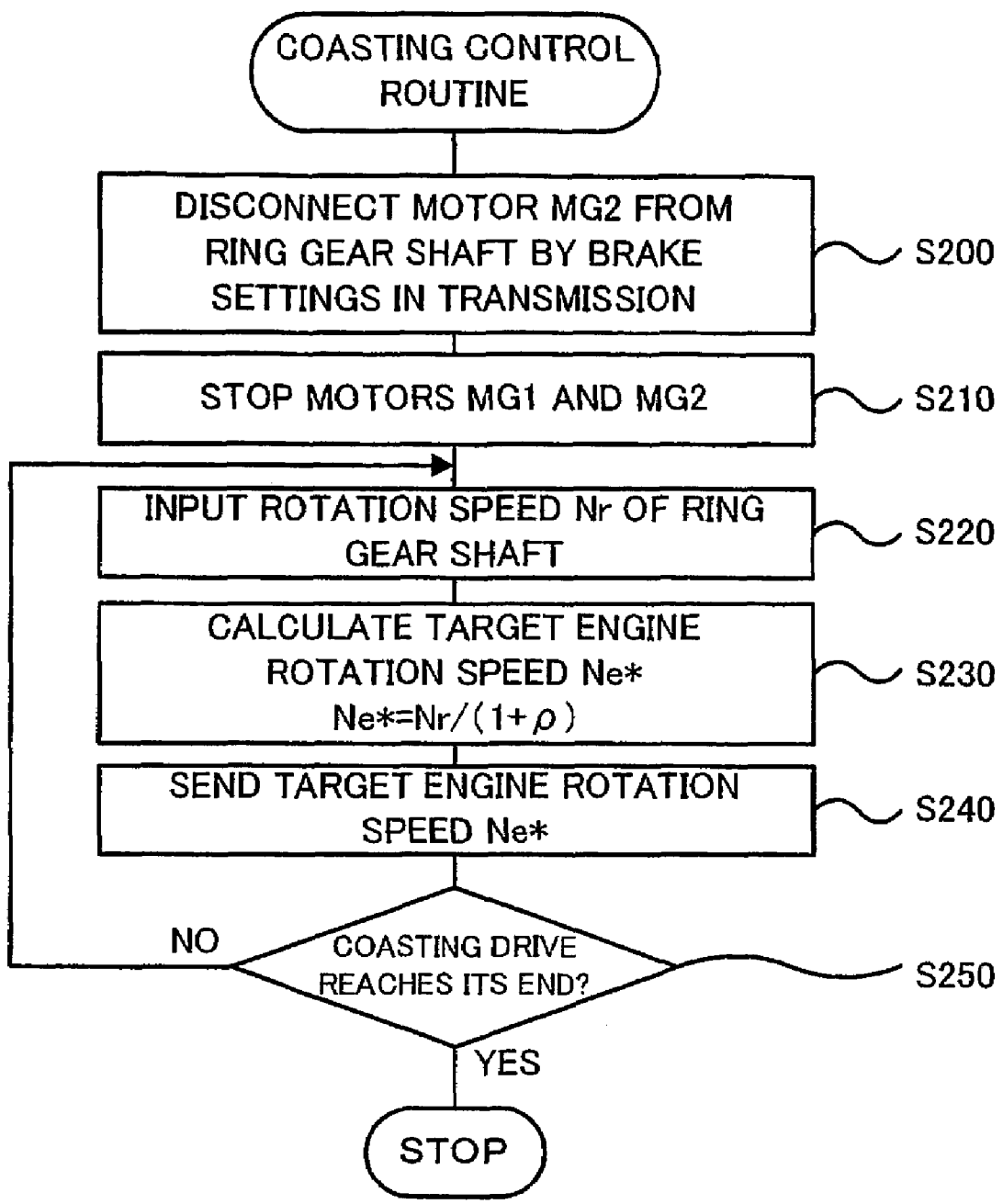
FIG. 5 is a flowchart showing a coasting control routine executed by a hybrid electronic control unit in the hybrid vehicle of the second embodiment.

The hybrid vehicle 20B of the second embodiment executes a coasting control routine of FIG. 5, in place of the coasting control routine of FIG. 3, in response to a coasting drive instruction. In the coasting control routine of the second embodiment, the CPU 72 of the hybrid electronic control unit 70 first releases both the brakes B1 and B2 of the transmission 60 to disconnect the motor MG2 from the ring gear shaft 32a or the drive shaft (step S200) and stops both the motors MG1 and MG2 (step S210). The coasting control routine then receives a rotation speed Nr of the ring gear shaft 32a (step S220) and calculates a target rotation speed Ne* of the engine 22 according to Equation (3) given below to make the rotation speed Nm1 of the motor MG1 equal to 0 (step S230):

$$Ne^* = Nr/(1+\rho) \quad (3)$$

Figure 6:
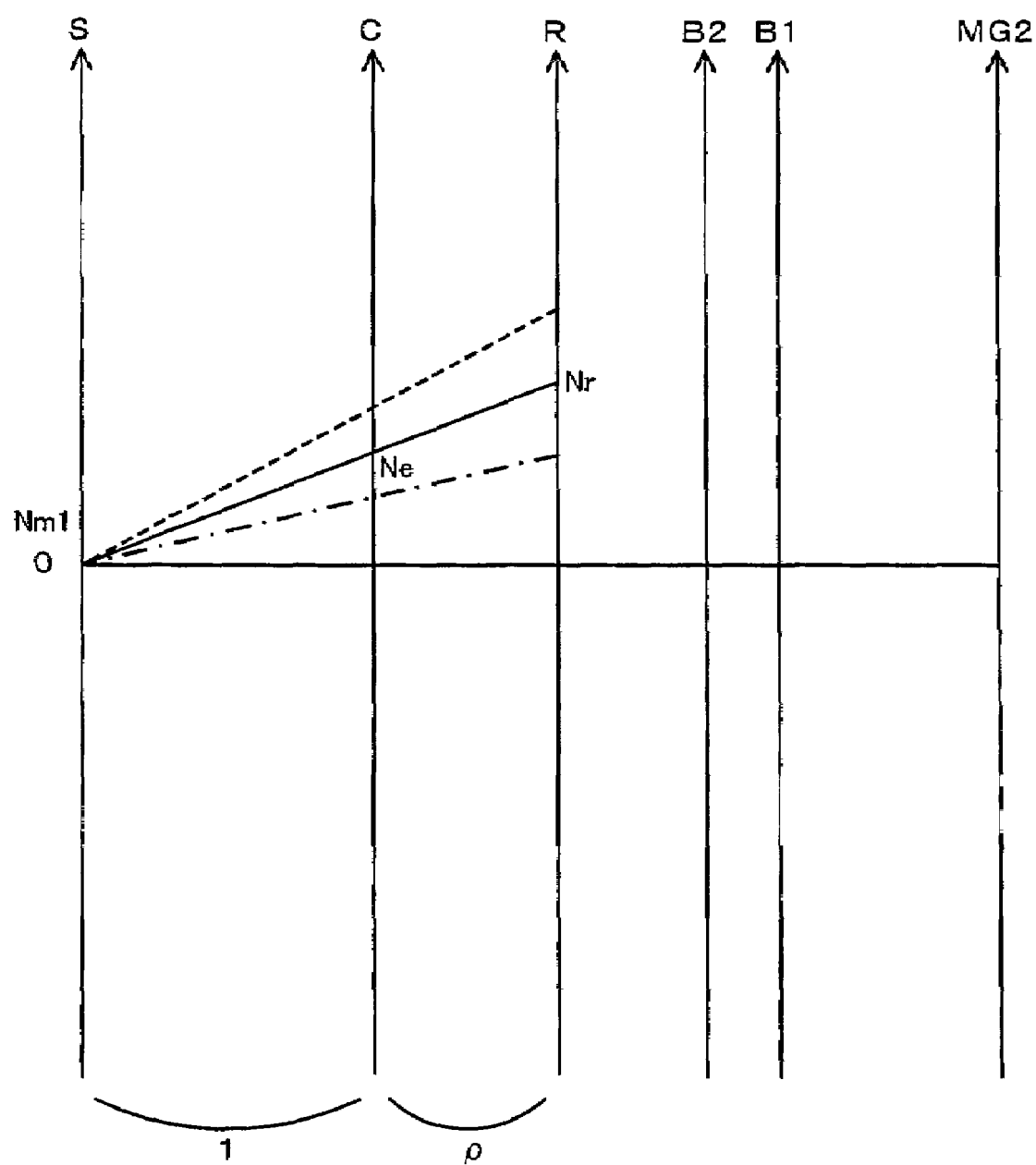
FIG. 6 is an alignment chart showing torque-rotation speed dynamics of respective rotation elements included in a power distribution integration mechanism of the second embodiment.

The calculated target rotation speed Ne* of the engine 22 is sent to the engine ECU 24 (step S240). The input rotation speed Nr of the ring gear shaft 32a may be computed by multiplying the measured vehicle speed V by a conversion factor or may be computed from a signal of a resolver attached to the ring gear shaft 32a. The engine ECU 24 receives the target rotation speed Ne* of the engine 22 and executes fuel injection control, ignition control, and regulation of the intake air flow to idle the engine 22 at the target rotation speed Ne*. FIG. 6 is an alignment chart showing torque-rotation speed dynamics of the respective rotation elements included in the power distribution integration mechanism 30 when the motor MG2 is disconnected from the ring gear shaft 32a and the engine 22 is driven and controlled to make the rotation speed Nm1 of the motor MG1 equal to 0. The broken line plot, the solid line plot, and the one-dot chain line plot show a variation in rotation speed relation with time. The drive control of the engine 22 to make the rotation speed Nm1 of the motor MG1 equal to 0 does not cause any rotation speed change of the motor MG1. This prevents an inertia torque from being generated by the rotation speed change of the motor MG1 and applied to the ring gear shaft 32a or the drive shaft via the power distribution integration mechanism 30. The settings of the brakes B1 and B2 in the transmission 60 disconnect the motor MG2 from the ring gear shaft 32a. This prevents a torque caused by a rotation speed change of the motor MG2 from being applied to the ring gear shaft 32a via the transmission 60. The ring gear shaft 32a is thus completely free, and the hybrid vehicle 20B of the second embodiment is coasted in the fully non-driving state. This is equivalent to the state of zero total of the torque applied to the ring gear shaft 32a via the power distribution integration mechanism 30 and the torque applied to the ring gear shaft 32a via the transmission 60.

The coasting control routine then determines whether the coasting drive reaches its end (step S250). In the condition of the continuous coasting drive, the coasting control routine repeats the processing of and after step S220. The routine thus repeatedly receives the rotation speed Nr of the ring gear shaft 32a, calculates the target rotation speed Ne* of the engine 22 to make the rotation speed Nm1 of the motor MG1 equal to 0, and idles the engine 22 at the target rotation speed Ne*. The hybrid vehicle 20B of the second embodiment can thus continue the coasting drive in the fully non-driving state to its end. This control enables accurate measurement of the driving resistance during such a coasting drive in the non-driving state. The coasting control routine is terminated, when it is determined at step S250 that the coasting drive reaches its end.

As described above, the hybrid vehicle 20B of the second embodiment controls the transmission 60 to disconnect the motor MG2 from the ring gear shaft 32a and idles the engine 22 to make the rotation speed Nm1 of the motor MG1 equal to 0. This control enables the hybrid vehicle 20B to be coasted in the fully non-driving state and thus ensures accurate measurement of the driving resistance of the hybrid vehicle 20B.

The hybrid vehicle 20B of the second embodiment idles the engine 22 to make the rotation speed Nm1 of the motor MG1 equal to 0. The requirement is to prohibit generation of an inertia torque accompanied by a rotation speed change of the motor MG1. The rotation speed Nm1 of the motor MG1 may thus be regulated to any other adequate level.

A hybrid vehicle 20C of a third embodiment is described below as still another mode of carrying out the invention. The hybrid vehicle 20C of the third embodiment has the identical hardware configuration with that of the hybrid vehicle 20 of the first embodiment shown in FIGS. 1 and 2. The respective constituents of the hybrid vehicle 20C of the third embodiment are expressed by the same numerals and symbols as those of the hybrid vehicle 20 of the first embodiment and are not specifically described here.

Figure 7:
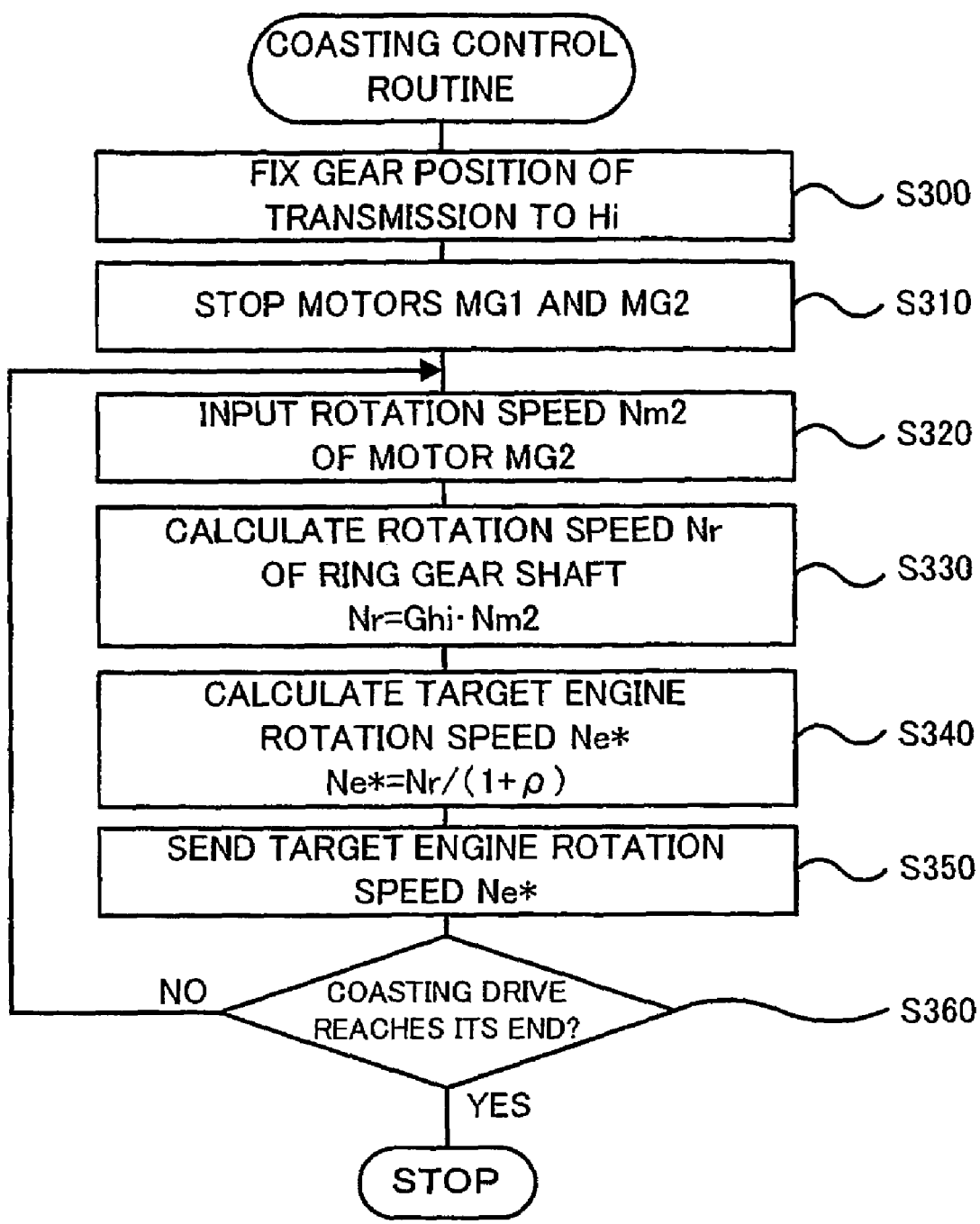
FIG. 7 is a flowchart showing a coasting control routine executed by a hybrid electronic control unit in the hybrid vehicle of the third embodiment.
Figure 8:
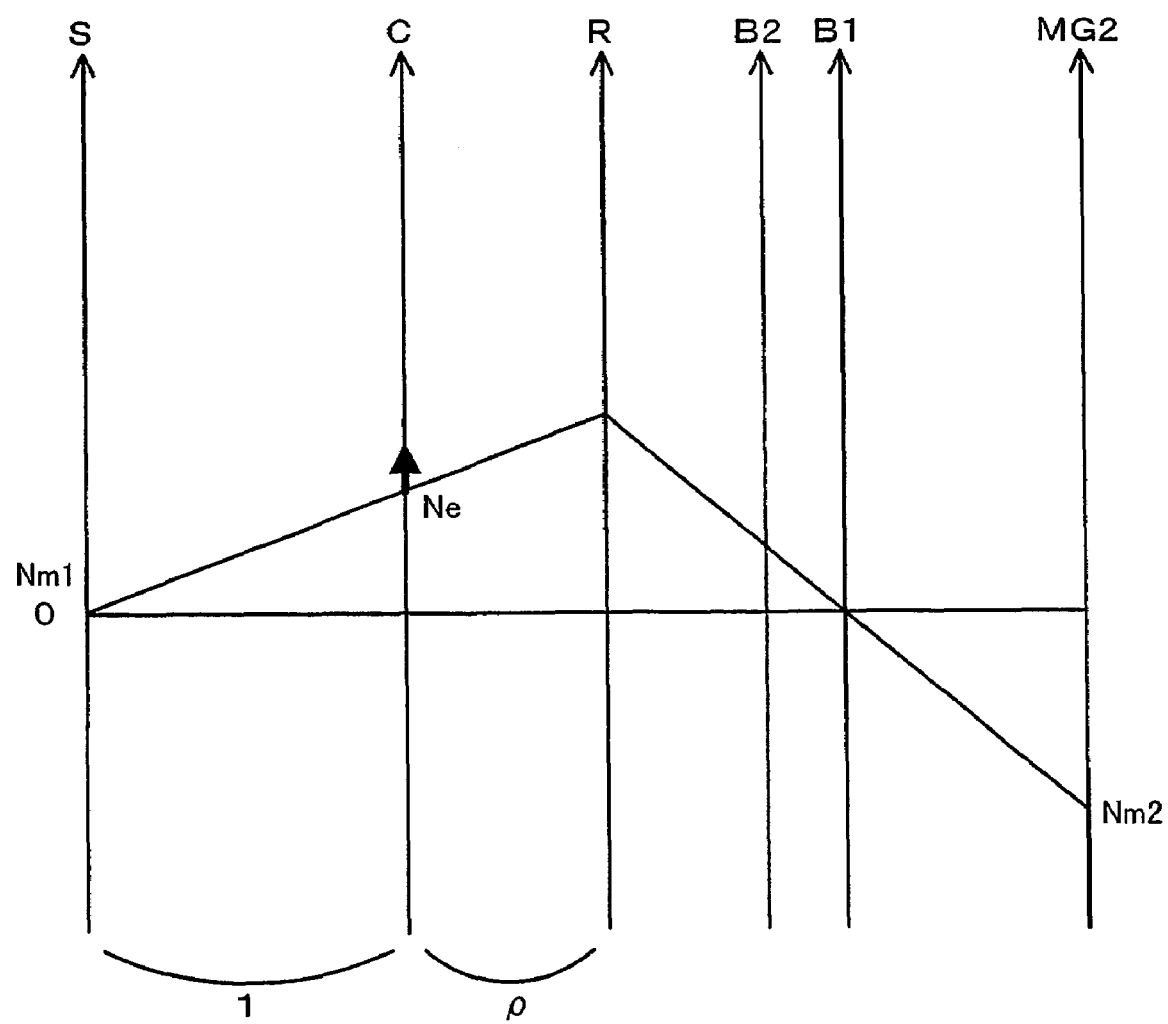
FIG. 8 is an alignment chart showing torque-rotation speed dynamics of respective rotation elements included in a power distribution integration mechanism of the third embodiment.

The hybrid vehicle 20C of the third embodiment executes a coasting control routine of FIG. 7, in place of the coasting control routine of FIG. 3, in response to a coasting drive instruction. In the coasting control routine of the third embodiment, the CPU 72 of the hybrid electronic control unit 70 first fixes the gear position of the transmission 60 to the Hi gear position (step S300), stops the motors MG1 and MG2 (step S310), and inputs the rotation speed Nm2 of the motor MG2 (step S320). The current rotation speed Nm2 of the motor MG2 is computed from the rotational position of the rotor of the motor MG2 detected by the rotational position detection sensor 44 and is received from the motor ECU 40 by communication. The coasting control routine subsequently calculates a rotation speed Nr of the ring gear shaft 32a or the drive shaft as the product of the input rotation speed Nm2 of the motor MG2 and the reduction gear ratio Ghi at the Hi gear position of the transmission 60 (step S330). The coasting control routine then calculates a target rotation speed Ne* of the engine 22 according to Equation (3) given above to make the rotation speed Nm1 of the motor MG1 equal to 0 (step S340). The calculated target rotation speed Ne* of the engine 22 is sent to the engine ECU 24 (step S350). The engine ECU 24 receives the target rotation speed Ne* of the engine 22 and executes fuel injection control, ignition control, and regulation of the intake air flow to idle the engine 22 at the target rotation speed Ne*, as in the coasting control flow of the second embodiment. FIG. 8 is an alignment chart showing torque-rotation speed dynamics of the respective rotation elements included in the power distribution integration mechanism 30 when the gear position of the transmission 60 is fixed to the Hi gear position and the engine 22 is driven and controlled to make the rotation speed Nm1 of the motor MG1 equal to 0. The drive control of the engine 22 to make the rotation speed Nm1 of the motor MG1 equal to 0 does not cause any rotation speed change of the motor MG1. This prevents an inertia torque from being generated by the rotation speed change of the motor MG1 and applied to the ring gear shaft 32a or the drive shaft via the power distribution integration mechanism 30. The motor MG2 is connected to the ring gear shaft 32a via the transmission 60. An inertia torque generated by a rotation speed change of the motor MG2 is accordingly output to the ring gear shaft 32a. The drive control of the engine 22 to make the rotation speed Nm1 of the motor MG1 equal to 0, however, enables the output power of the engine 22 to cancel out the generated inertia torque. The ring gear shaft 32a is thus completely free, and the hybrid vehicle 20C of the third embodiment is coasted in the fully non-driving state. This is equivalent to the state of zero total of the torque applied to the ring gear shaft 32a via the power distribution integration mechanism 30 and the torque applied to the ring gear shaft 32a via the transmission 60. Calculation of the rotation speed Nr of the ring gear shaft 32a from the rotation speed Nm2 of the motor MG2 has the higher accuracy than calculation of the rotation speed Nr of the ring gear shaft 32a from the vehicle speed V. Another advantage of this control procedure does not require any additional sensor, such as a resolver, attached to the ring gear shaft 32a to directly measure the rotation speed Nr of the ring gear shaft 32a.

The coasting control routine then determines whether the coasting drive reaches its end (step S360). In the condition of the continuous coasting drive, the coasting control routine repeats the processing of and after step S320. The routine thus repeatedly inputs the rotation speed Nm2 of the motor MG2, calculates the target rotation speed Ne* of the engine 22 to make the rotation speed Nm1 of the motor MG1 equal to 0, and idles the engine 22 at the target rotation speed Ne*. The hybrid vehicle 20C of the third embodiment can thus continue the coasting drive in the fully non-driving state to its end. This control enables accurate measurement of the driving resistance during such a coasting drive in the non-driving state. The coasting control routine is terminated, when it is determined at step S360 that the coasting drive reaches its end.

As described above, the hybrid vehicle 20C of the third embodiment fixes the gear position of the transmission 60 to the Hi gear position and idles the engine 22 to make the rotation speed Nm1 of the motor MG1 equal to 0. This control enables the hybrid vehicle 20C to be coasted in the fully non-driving state and thus ensures accurate measurement of the driving resistance of the hybrid vehicle 20C. The control procedure of the third embodiment calculates the rotation speed Nr of the ring gear shaft 32a from the rotation speed Nm2 of the motor MG2 and computes the target rotation speed Ne* of the engine 22 from the calculated rotation speed Nr of the ring gear shaft 32a to make the rotation speed Nm1 of the motor MG1 equal to 0. Calculation of the rotation speed Nr of the ring gear shaft 32a from the rotation speed Nm2 of the motor MG2 has the higher accuracy than calculation of the rotation speed Nr of the ring gear shaft 32a from the vehicle speed V. This leads to the higher accuracy of the computed target rotation speed Ne* of the motor MG2. Another advantage of this control procedure does not require any additional sensor, such as a resolver, attached to the ring gear shaft 32a to directly measure the rotation speed Nr of the ring gear shaft 32a.

The hybrid vehicle 20C of the third embodiment calculates the rotation speed Nr of the ring gear shaft 32a from the rotation speed Nm2 of the motor MG2 and computes the target rotation speed Ne* of the engine 22 from the calculated rotation speed Nr of the ring gear shaft 32a to make the rotation speed Nm1 of the motor MG1 equal to 0. One modified structure may use a sensor, such as a resolver, attached to the ring gear shaft 32a to directly measure the rotation speed Nr of the ring gear shaft 32a. The target rotation speed Ne* of the engine 22 may be computed from the rotation speed Nr of the ring gear shaft 32a measured by the sensor to make the rotation speed Nm1 of the motor MG1 equal to 0.

The hybrid vehicle 20C of the third embodiment idles the engine 22 to make the rotation speed Nm1 of the motor MG1 equal to 0. The requirement is to prohibit generation of an inertia torque accompanied by a rotation speed change of the motor MG1. The rotation speed Nm1 of the motor MG1 may thus be regulated to any other adequate level.

Figure 9:
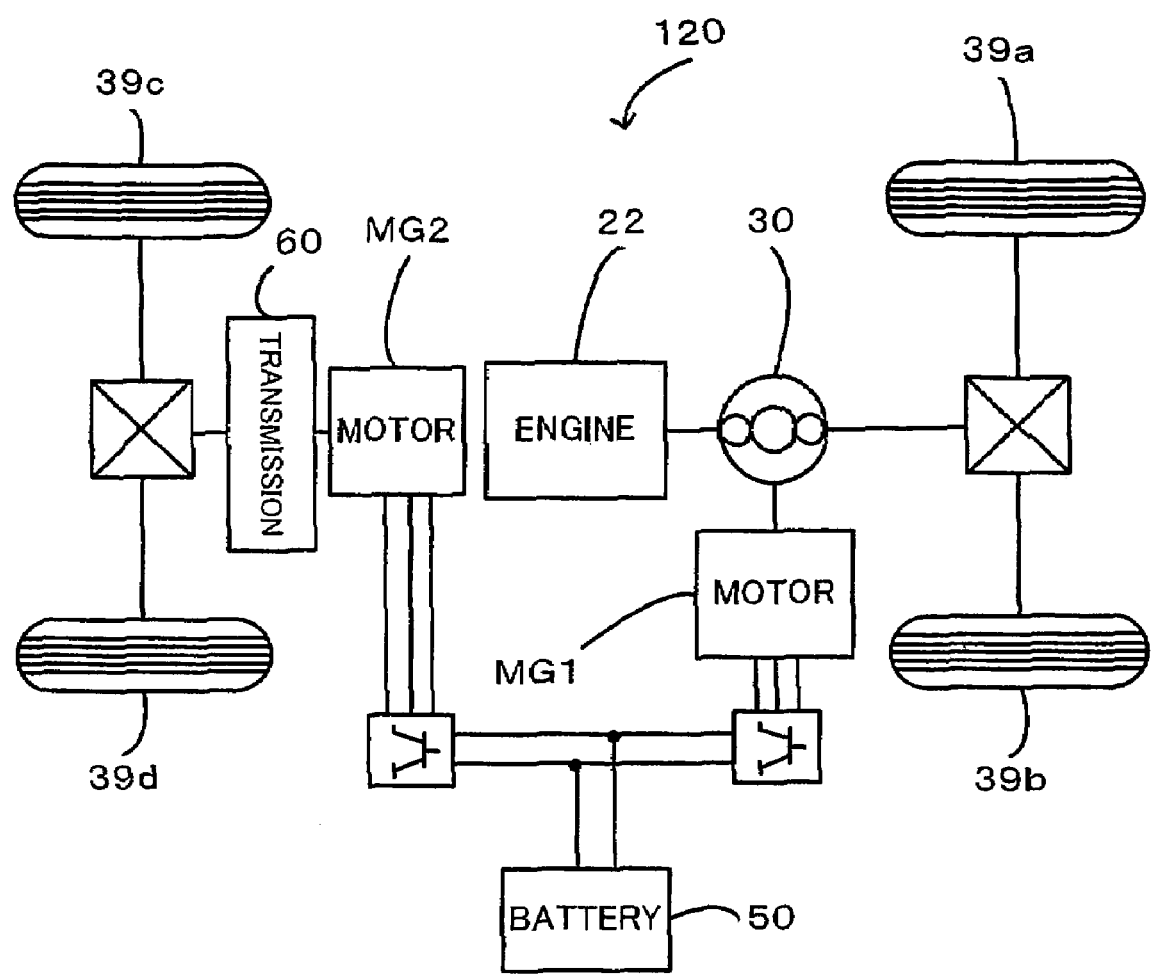
FIG. 9 schematically illustrates the configuration of another hybrid vehicle in one modified example of the invention.

In the hybrid vehicles 20, 20B, and 20C of the first, the second, and the third embodiments described above, the power of the motor MG2 is converted by the gear change in the transmission 60 and is output to the ring gear shaft 32a. The technique of the invention is, however, not restricted to this configuration but is also applicable to a hybrid vehicle 120 of one modified configuration shown in FIG. 9. In the hybrid vehicle 120 of this modified example, the power of the motor MG2 is connected via the transmission 60 to a different axle (axle linked to wheels 39c and 39d) from an axle connected with the ring gear shaft 32a (axle linked to the drive wheels 39a and 39b). In this modified configuration, the motor MG2 is connected to the ring gear shaft 32a or the drive shaft via the road surface.

The technique of the invention is not restricted to these hybrid vehicles 20, 20B, and 20C described above, but is also actualized by measurement methods of the driving resistance that correspond to the control procedures of these hybrid vehicles 20, 20B, and 20C.

The embodiment and its modified examples discussed above are to be considered in all aspects as illustrative and not restrictive. There may be many other modifications, changes, and alterations without departing from the scope or spirit of the main characteristics of the present invention.

INDUSTRIAL APPLICABILITY

The technique of the invention is applicable to manufacturing industries of motor vehicles.

The invention claimed is:

1. A hybrid vehicle, comprising:
an internal combustion engine;
an electric power-mechanical power input output mechanism that is connected to an output shaft of the internal combustion engine and to a drive shaft linked with an axle of said hybrid vehicle and outputs at least part of output power of the internal combustion engine to the drive shaft through input and output of electric power and mechanical power;
a motor that is capable of inputting and outputting power;
a transmission unit that changes a gear ratio set for conversion of a power output from the motor to the drive shaft and a power input from the drive shaft to the motor; and
a driving resistance measurement control module that controls the internal combustion engine, the electric power-mechanical power input output mechanism, the motor, and the transmission unit, in response to a predetermined operation, to set said hybrid vehicle in a driving resistance measurement mode for measurement of a driving resistance of said hybrid vehicle.

2. A hybrid vehicle in accordance with claim 1, wherein said driving resistance measurement control module controls the internal combustion engine, the electric power-mechanical power input output mechanism, the motor, and the transmission unit to prohibit application of a driving force to the drive shaft via the electric power-mechanical power input output mechanism and the transmission unit.

3. A hybrid vehicle in accordance with claim 2, wherein said driving resistance measurement control module controls the internal combustion engine, the electric power-mechanical power input output mechanism, the motor, and the transmission unit to give zero total of a power output to the drive shaft via the electric power-mechanical power input output mechanism and a power output to the drive shaft via the transmission unit.

4. A hybrid vehicle in accordance with claim 3, wherein the electric power-mechanical power input output mechanism comprises:
a three shaft-type power input output module that is linked to three shafts, the output shaft of the internal combustion engine, the drive shaft, and a rotating shaft, and automatically determines power input from and output to a residual one shaft based on powers input from and output to any two shafts among the three shafts; and
a generator that inputs and outputs power from and to the rotating shaft, and
said driving resistance measurement control module controls the internal combustion engine to be driven at a preset rotation speed, controls the generator to prohibit any power input and output, controls the transmission unit to prohibit a change of the gear ratio, and controls the motor to cause a power output to the drive shaft via the three shaft-type power input output module with a variation in rotation speed of the generator to be cancelled out by the power output to the drive shaft via the transmission unit.

5. A hybrid vehicle in accordance with claim 4, wherein the transmission unit is a step transmission having multiple different speeds, and
said driving resistance measurement control module controls the transmission unit to fix the speed to a high speed position.

6. A hybrid vehicle in accordance with claim 4, wherein said driving resistance measurement control module controls the internal combustion engine to have a stop at a rotation speed of 0.

7. A hybrid vehicle in accordance with claim 3, wherein the electric power-mechanical power input output mechanism comprises:
a three shaft-type power input output module that is linked to three shafts, the output shaft of the internal combustion engine, the drive shaft, and a rotating shaft, and automatically determines power input from and output to a residual one shaft based on powers input from and output to any two shafts among the three shafts; and
a generator that inputs and outputs power from and to the rotating shaft, said transmission unit connects and disconnects the motor with and from the drive shaft, and said driving resistance measurement control module controls the generator to prohibit any power input and output, controls the internal combustion engine to drive the generator at a preset rotation speed, controls the transmission unit to disconnect the motor from the drive shaft, and controls the motor to prohibit any power input and output.

8. A hybrid vehicle in accordance with claim 7, wherein said driving resistance measurement control module controls the internal combustion engine to stop the generator at a rotation speed of 0.

9. A hybrid vehicle in accordance with claim 7, said hybrid vehicle further comprising:

a drive shaft rotation speed measurement unit that measures a rotation speed of the drive shaft, wherein said driving resistance measurement control module computes a target rotation speed of the output shaft of the internal combustion engine to rotate the rotating shaft at the preset rotation speed, based on the rotation speed of the drive shaft measured by the drive shaft rotation speed measurement unit and a rotation relation of the three shafts in the three shaft-type power input output module, and controls the internal combustion engine to be driven at the computed target rotation speed.

10. A hybrid vehicle in accordance with claim 7, said hybrid vehicle further comprising:

a rotor rotation speed measurement unit that measures a rotation speed of a rotor in the motor, wherein said driving resistance measurement control module calculates a rotation speed of the drive shaft from the rotation speed of the rotor in the motor measured by the rotor rotation speed measurement unit and the gear ratio set in the transmission unit, computes a target rotation speed of the output shaft of the internal combustion engine to rotate the rotating shaft at the preset rotation speed, based on the calculated rotation speed of the drive shaft and a rotation relation of the three shafts in the three shaft-type power input output module, and controls the internal combustion engine to be driven at the computed target rotation speed.

11. A hybrid vehicle in accordance with claim 3, wherein the electric power-mechanical power input output mechanism comprises:

a three shaft-type power input output module that is linked to three shafts, the output shaft of the internal combustion engine, the drive shaft, and a rotating shaft, and automatically determines power input from and output to a residual one shaft based on powers input from and output to any two shafts among the three shafts; and a generator that inputs and outputs power from and to the rotating shaft, and said driving resistance measurement control module controls the generator to prohibit any power input and output, controls the internal combustion engine to drive the generator at a preset rotation speed, controls the transmission unit to prohibit a change of the gear ratio, and controls the motor to prohibit any power input and output.

12. A hybrid vehicle in accordance with claim 11, wherein said driving resistance measurement control module controls the internal combustion engine to stop the generator at a rotation speed of 0.

13. A hybrid vehicle in accordance with claim 11, said hybrid vehicle further comprising:

a drive shaft rotation speed measurement unit that measures a rotation speed of the drive shaft, wherein said driving resistance measurement control module computes a target rotation speed of the output shaft of the internal combustion engine to rotate the rotating shaft at the preset rotation speed, based on the rotation speed of the drive shaft measured by the drive shaft rotation speed measurement unit and a rotation relation of the three shafts in the three shaft-type power input output module, and controls the internal combustion engine to be driven at the computed target rotation speed.

14. A hybrid vehicle in accordance with claim 11, said hybrid vehicle further comprising:

a rotor rotation speed measurement unit that measures a rotation speed of a rotor in the motor, wherein said driving resistance measurement control module calculates a rotation speed of the drive shaft from the rotation speed of the rotor in the motor measured by the rotor rotation speed measurement unit and the gear ratio set in the transmission unit, computes a target rotation speed of the output shaft of the internal combustion engine to rotate the rotating shaft at the preset rotation speed, based on the calculated rotation speed of the drive shaft and a rotation relation of the three shafts in the three shaft-type power input output module, and controls the internal combustion engine to be driven at the computed target rotation speed.

15. A driving resistance measurement method of measuring a driving resistance of a hybrid vehicle, said hybrid vehicle comprising:

an internal combustion engine;

an electric power-mechanical power input output mechanism that is connected to an output shaft of the internal combustion engine and to a drive shaft linked with an axle of said hybrid vehicle and outputs at least part of output power of the internal combustion engine to the drive shaft through input and output of electric power and mechanical power; a motor that is capable of inputting and outputting power; and a transmission unit that changes a gear ratio set for conversion of a power output from the motor to the drive shaft and a power input from the drive shaft to the motor, said driving resistance measurement method measuring the driving resistance of said hybrid vehicle, while controlling the internal combustion engine, the electric power-mechanical power input output mechanism, the motor, and the transmission unit to prohibit application of a driving force to the drive shaft via the electric power-mechanical power input output mechanism and the transmission unit.

16. A driving resistance measurement method in accordance with claim 15, said driving resistance measurement method measuring the driving resistance of said hybrid vehicle, while controlling the internal combustion engine, the electric power-mechanical power input output mechanism, the motor, and the transmission unit to give zero total of a power output to the drive shaft via the electric power-mechanical power input output mechanism and a power output to the drive shaft via the transmission unit.

17. A driving resistance measurement method in accordance with claim 16, wherein the electric power-mechanical power input output mechanism comprises:

a three shaft-type power input output module that is linked to three shafts, the output shaft of the internal combustion engine, the drive shaft, and a rotating shaft, and automatically determines power input from and output to a residual one shaft based on powers input from and output to any two shafts among the three shafts; and a generator that inputs and outputs power from and to the rotating shaft, said driving resistance measurement method measuring the driving resistance of said hybrid vehicle, while controlling the internal combustion engine to be driven at a preset rotation speed, controlling the generator to prohibit any power input and output, controlling the transmission unit to prohibit a change of the gear ratio, and controlling the motor to cause a power output to the drive shaft via the three shaft-type power input output module with a variation in rotation speed of the generator to be cancelled out by the power output to the drive shaft via the transmission unit.

18. A driving resistance measurement method in accordance with claim 16, wherein the electric power-mechanical power input output mechanism comprises:

a three shaft-type power input output module that is linked to three shafts, the output shaft of the internal combustion engine, the drive shaft, and a rotating shaft, and automatically determines power input from and output to a residual one shaft based on powers input from and output to any two shafts among the three shafts; and a generator that inputs and outputs power from and to the rotating shaft, and said transmission unit connects and disconnects the motor with and from the drive shaft, said driving resistance measurement method measuring the driving resistance of said hybrid vehicle, while controlling the generator to prohibit any power input and output, controlling the internal combustion engine to drive the generator at a preset rotation speed, controlling the transmission unit to disconnect the motor from the drive shaft, and controlling the motor to prohibit any power input and output.

19. A driving resistance measurement method in accordance with claim 18, said driving resistance measurement method either directly or indirectly measuring a rotation speed of the drive shaft, said driving resistance measurement method measuring the driving resistance of said hybrid vehicle, while computing a target rotation speed of the output shaft of the internal combustion engine to rotate the rotating shaft at the preset rotation speed, based on the measured rotation speed of the drive shaft and a rotation relation of the three shafts in the three shaft-type power input output module, and controlling the internal combustion engine to be driven at the computed target rotation speed.

20. A driving resistance measurement method in accordance with claim 16, wherein the electric power-mechanical power input output mechanism comprises:

a three shaft-type power input output module that is linked to three shafts, the output shaft of the internal combustion engine, the drive shaft, and a rotating shaft, and automatically determines power input from and output to a residual one shaft based on powers input from and output to any two shafts among the three shafts; and a generator that inputs and outputs power from and to the rotating shaft, said driving resistance measurement method measuring the driving resistance of said hybrid vehicle, while controlling the generator to prohibit any power input and output, controlling the internal combustion engine to drive the generator at a preset rotation speed, controlling the transmission unit to prohibit a change of the gear ratio, and controlling the motor to prohibit any power input and output.

21. A driving resistance measurement method in accordance with claim 20, said driving resistance measurement method either directly or indirectly measuring a rotation speed of the drive shaft, said driving resistance measurement method measuring the driving resistance of said hybrid vehicle, while computing a target rotation speed of the output shaft of the internal combustion engine to rotate the rotating shaft at the preset rotation speed, based on the measured rotation speed of the drive shaft and a rotation relation of the three shafts in the three shaft-type power input output module, and controlling the internal combustion engine to be driven at the computed target rotation speed.

\* \* \* \* \*

UNITED STATES PATENT AND TRADEMARK OFFICE
CERTIFICATE OF CORRECTION

PATENT NO. : 7,658,248 B2  Page 1 of 1
APPLICATION NO. : 11/628238
DATED : February 9, 2010
INVENTOR(S) : Kaya et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 503 days.

Signed and Sealed this

Thirtieth Day of November, 2010

David J. Kappos
*Director of the United States Patent and Trademark Office*